United States Patent [19]

Winyard et al.

[11] Patent Number: 5,322,003
[45] Date of Patent: Jun. 21, 1994

[54] MODULAR HYDRAULIC CONTROL SYSTEM

[75] Inventors: David C. Winyard, Annapolis; Waldemar C. Lindstrom, Kensington, both of Md.

[73] Assignee: The United States of America as represented by the Secretary of the Navy, Washington, D.C.

[21] Appl. No.: 953,342

[22] Filed: Sep. 30, 1992

[51] Int. Cl.[5] .................................................. F15B 9/03
[52] U.S. Cl. .................................... 91/363 A; 91/509; 60/403
[58] Field of Search ............... 60/40; 91/363 A, 509, 91/510

[56] References Cited

U.S. PATENT DOCUMENTS

| | | | |
|---|---|---|---|
| 2,976,848 | 3/1961 | Place | 91/363 A |
| 3,138,002 | 6/1964 | Ernst et al. | 91/510 |
| 3,338,139 | 8/1967 | Wood | 92/363 A |
| 3,482,486 | 12/1969 | Nordholm | 91/509 |
| 3,724,330 | 4/1973 | Mason | 91/363 A |
| 4,150,686 | 4/1979 | El Sherif et al. | 91/363 A |
| 4,436,018 | 3/1984 | Murphy et al. | 91/363 A |

Primary Examiner—Edward K. Look
Assistant Examiner—F. Daniel Lopez
Attorney, Agent, or Firm—Gary G. Borda

[57] ABSTRACT

A system of modular electrohydraulic servovalves is centrally controlled and may be used to control the operation of critical hydraulic actuators. A programmable controller operates a group of modular servovalves which each deliver a portion of the total actuator fluid requirements. The flow rate, valve position, and valve pressure of each servovalve is monitored by the controller and compared to expected values in memory to determine whether a servovalve malfunction exists. If so, the controller maintains the required flow rate to the actuator by closing the malfunctioning valve and either activating a spare or proportionally increasing the flow rates of the remaining servovalves to compensate for the loss.

8 Claims, 7 Drawing Sheets

MODULAR HYDRAULIC CONTROL SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates to a high reliability, low-noise, pressurized fluid control system and, more particularly, to a system of one or more modular servo valves operated individually or in groups by a central controller to supply any desired fluid pressure to a hydraulic actuator aboard a submarine or other marine vessel.

Submarines and other ocean going vessels currently utilize a centralized hydraulic power plant which supplies fluid power to a plurality of actuators located throughout the ship. Each actuator performs a specific function, and the power requirements of each varies widely with the application. For example, ram movements in a typical sea water valve actuator may require less than 10 gal/min, while those in an actuator connected to a control surface such as a diving plane or rudder may require over 100 gal/min.

To ensure that a critical component remains operable despite extensive equipment damage or failure, shipboard hydraulic systems generally incorporate some level of redundancy. For example, flood control systems, installed where seawater pipes enter or leave a submarine's power pressure hull, typically employ redundant hydraulic circuits each consisting of a fluid reservoir, pump, and supply/return lines for supplying fluid to an actuator. The redundancy minimizes the effect of component failure in any one circuit so that the actuator is supplied with fluid at all times.

Control surface hydraulic systems, being similarly critical to ship safety, must be very reliable and therefore must presently be designed to include a significant level of redundancy. Typically, control surface rams receive fluid power from two sources via independent valves, in effect, from a normal servo valve (SV) and an emergency control valve (ECV). The SV and ECV are each constructed with the capacity to independently supply all of the pressurized fluid required, at the desired flow rate, to the actuator. Thus, if the SV or other component of the normal fluid supply system fails, a power transfer valve (PTV) in fluid communication with the SV and ECV continues to supply fluid power to the control surface ram by shifting from a normal mode to an emergency mode. In shifting to the emergency mode, the PTV shuts a valve connecting it to the SV and opens a valve to the ECV, thereby maintaining the flow of needed fluid to the actuator.

The benefits of maintaining redundant "back-up" systems, however, is not without cost. In submarine systems, the expense of providing and maintaining duplicate systems for the control surface actuators is particularly large because they must meet large power requirements yet operate at very low noise levels.

SUMMARY OF THE INVENTION

It is therefore an object of the present invention to provide a modular electrohydraulic servo valve system capable of low-noise operation even at high power levels.

It is a further object of the present invention to provide a single modular servo valve which is capable of meeting both low and high flow delivery requirements.

It is another object of the present invention to provide a modular servo valve system which provides high speed, emergency or low speed operation of a control surface actuator.

It is yet another object of the present invention to provide a modular servo valve system which avoids the degree of redundancy present in prior art hydraulic delivery systems.

In general, these and other objects are achieved by a modular hydraulic control system for controlling a fluid actuator of the type having a cylinder, a ram member slidably disposed within the cylinder and defining first chamber and second chambers therein, an actuator rod member connected to the ram member, first port means for admitting pressurized fluid into and out of the first chamber, second port means for transferring pressurized fluid into and out of the second chamber, and valve means, in fluid communication with the first and second port means and responsive to a mode control signal, for transferring fluid at a total flow rate corresponding to a total flow rate command signal into the first chamber when in a first mode and into the second chamber when in a second mode.

The valve means includes control means for receiving a desired ram position signal and for generating the mode control signal, a total flow rate command signal, and a subvalve rate control signal in response thereto. The valve means also comprises at least one subvalve, each subvalve comprising means responsive to the mode control signal and means for transferring fluid at a subvalve flow rate corresponding to the subvalve rate control signal into the first chamber when in the first mode and into the second chamber when in the second mode. Each subvalve comprises an electrohydraulic servovalve for transferring fluid from and to the chambers of the actuator.

The control means includes means for detecting an actual flow rate through each of the servovalves, and based on those detected flow rates, for generating the subvalve rate control signals such that the actual detected flow rates through each of the subvalves are substantially equal and such that a sum of the actual detected flow rates substantially equals the total flow rate.

The system further comprises means operatively connected to the valve means for detecting malfunction of the servovalves and means for isolating a malfunctioning servovalve from the first and second port means. The detecting means comprises means for measuring an actual position of each servovalve and for sending a signal corresponding thereto to the control means, and means for measuring actual flow rate through each servovalve and sending a signal corresponding thereto to said control means. The control means comprises a programmable controller which includes a memory containing data corresponding to expected servovalve flow rate values as a function of servovalve position. The controller receives the position and flow rate signals from the detecting means and compares the values represented thereby with the expected data contained within its memory.

The system preferably comprises a plurality of spare servovalves and the programmable controller includes means for energizing at least one spare servovalve to replace a malfunctioning servovalve such that the sum of the actual detected flow rates remains substantially equal to the total flow rate.

An embodiment of the modular hydraulic control system controls first and second actuators. Each actuator is of the type having a cylinder, a ram member slidably disposed within the cylinder and defining first chamber and second chambers therein, an actuator rod member connected to the ram member, first port means for admitting pressurized fluid into and out of the first chamber, and second port means for transferring pressurized fluid into and out of the second chamber. The system comprises means for coupling the rod members of the first and second actuators in substantially longitudinal relation, a first subvalve in fluid communication with the first and second port means of the first actuator, and a second subvalve in fluid communication with the first and second port means of the second actuator. Each subvalve further comprises means for rapidly transferring fluid between the first and second chambers of a respective one of the actuators. The system also includes control means for receiving a desired ram position signal and for generating subvalve rate control signals in response thereto, wherein the first and second subvalves are operated in accordance with the control signals.

The control means includes means for detecting an actual flow rate through each of the servovalves, and based on the detected flow rates, for generating subvalve rate control signals such that the actual detected flow rates through each of said subvalves are substantially equal. The system further comprises means for detecting a malfunction of the servovalves and means for isolating a malfunctioning servovalve from the first and second port means of respective actuators. The detecting means comprises means for measuring an actual position of each servovalve and for sending a signal corresponding thereto to the control means, and means for measuring actual flow rate through each servovalve and sending a signal corresponding thereto to the control means.

The control means comprises a programmable controller which includes in its memory data corresponding to expected flow rate values as a function of servovalve position. The controller receives the position and flow rate signals from the detecting means and compares values represented thereby with the expected data.

The system further comprises a plurality of spare servovalves and the programmable controller comprises means for energizing at least one spare servovalve to replace a malfunctioning servovalve such that the sum of said actual detected flow rates remains substantially equals to, said total flow rate after a malfunction. The fluid rapid transfer means are operable in response to signals sent by said programmable controller, the programmable controller being programmed to initiate rapid transfer of fluid between the first and second chambers of said first actuator upon malfunction of said first servovalve.

A method of operating a hydraulic ram actuator comprises the steps of ascertaining an actual position of said ram by monitoring an output signal of a ram position sensing means, calculating with a programmable controller the total volume change required in one of the chambers of the activator to achieve a desired ram position, generating with the programmable controller a flow control signal to at least one electrohydraulic servovalve, the flow control signal directing the servovalve to transfer hydraulic fluid to one of the chambers to achieve said desired ram position.

The generating step of the method includes the steps of monitoring the signals of respective flow rate and position sensors connected to corresponding electrohydraulic servovalves with the controller, determining which of the servovalves to operate in accordance with the monitored signals, calculating the flow rate of fluid to be delivered by each operative servovalves to obtain the desired ram position and generating a signal for each operative servovalve corresponding to the calculated flow rates.

The determining step comprises the steps of comparing sensed values of flow rate and pressure for each of said servovalves with expected values stored in controller memory and identifying any malfunctioning servovalves. Any malfunctioning servovalve is isolated from said chambers and the flow rates of other operative servovalves are increased to compensate for the malfunctioning valve until the ram achieves said desired position. The determining step may alternatively comprise the step of isolating any malfunctioning servovalve from said chambers and initiating flow through a spare servovalve until the ram achieves said desired position.

DESCRIPTION OF THE INVENTION

Figure 1:
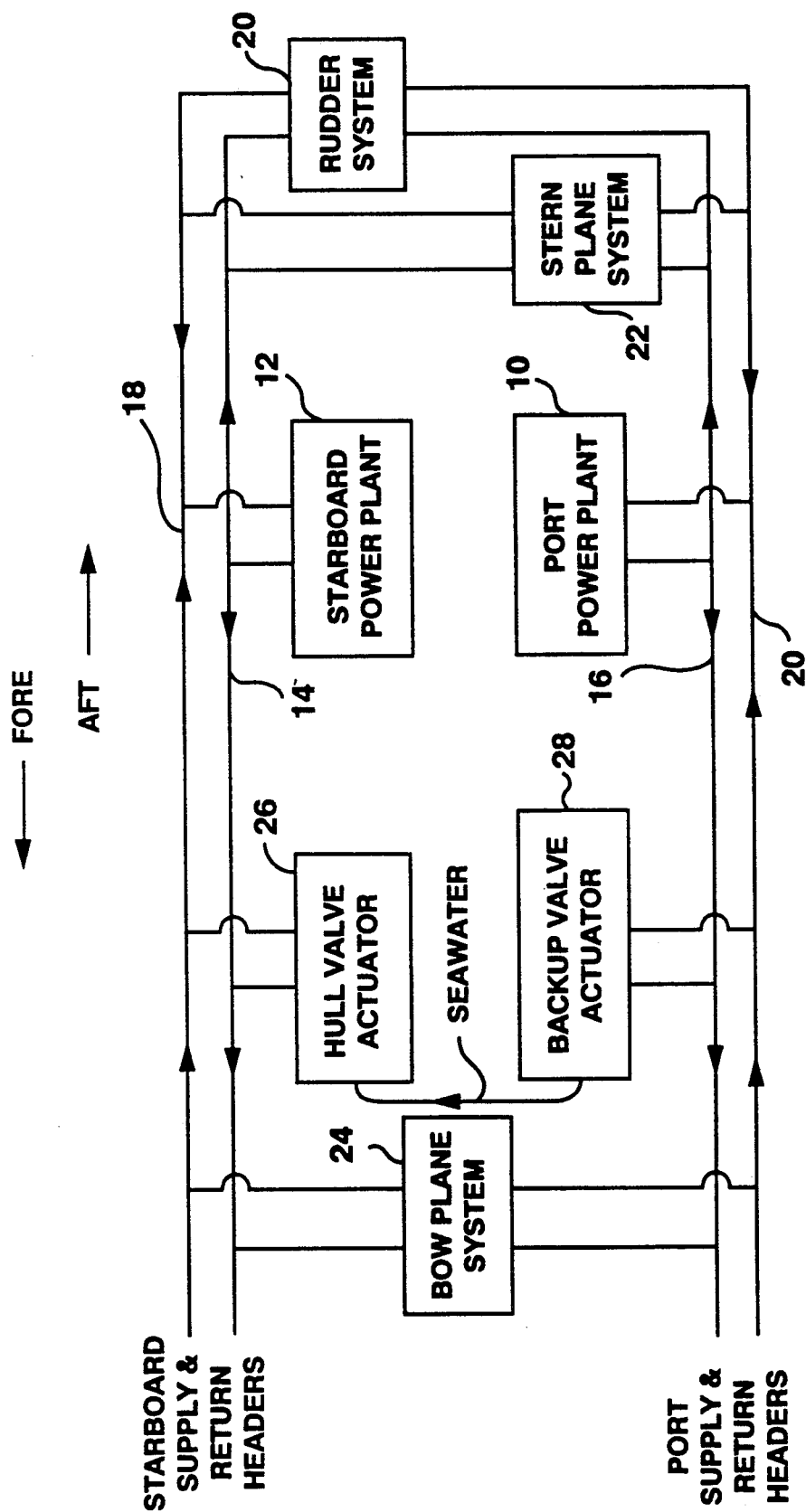
FIG. 1 is a hydraulic schematic diagram illustrating a centralized fluid supply system as found aboard a conventional submarine.

FIG. 1 represents a conventional system for supplying hydraulic fluid to various actuators throughout a submarine. The conventional system comprises two independent fluid supply circuits. The first supply system is located on the port side of the vessel and comprises a port hydraulic power plant 10 consisting of a reservoir and a pump means (not shown). The second supply system is located on the starboard side of the vessel and comprises a starboard hydraulic power plant 12 consisting of a reservoir and a pump means (not shown).

The pump means of the power plants are interconnected with fluid operated systems throughout the vessel by respective supply lines 14 and 16. Respective return lines 18 and 20 then return the fluid to the reservoirs of the associated supply circuit. Critical fluid operated systems, such as the rudder system 20, the diving plane systems 22 and 24, and the hull valve actuators 26 and 28, may be supplied with fluid by either of the independent fluid supply circuits.

Figure 2:
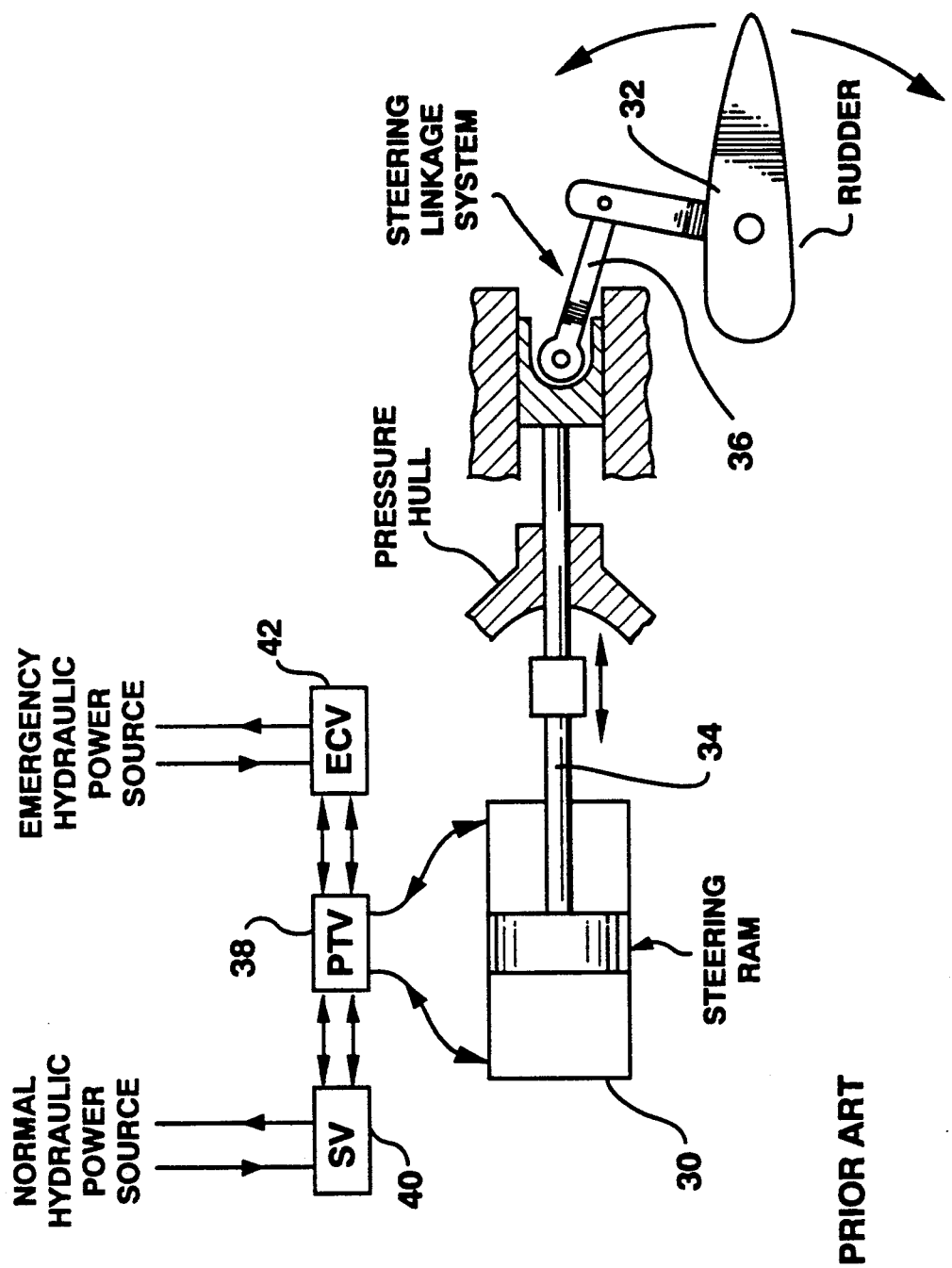
FIG. 2 is a hydraulic schematic diagram illustrating a conventional fluid delivery system to a control surface actuator.

FIG. 2 illustrates a conventional hydraulic flow system for supplying hydraulic fluid to a control surface actuator 30. Rudder 32 is operatively coupled to ram 34 of actuator 30 by a suitable steering linkage 36. As discussed above, since the rudder 32 is a crucial element of the directional control system of the submarine, the conventional rudder hydraulic supply system incorporates independent normal and emergency sources of hydraulic fluid. Power transfer valve 38, connected to normal supply servovalve 40 and emergency supply servovalve 42, delivers fluid to actuator 30 during malfunction of servovalve 40 or disruption of flow therefrom by opening servovalve 42. Conventional position and pressure sensing devices (not shown) detect servovalve pressure losses and other malfunctions to trigger the transfer operation.

Figure 3:
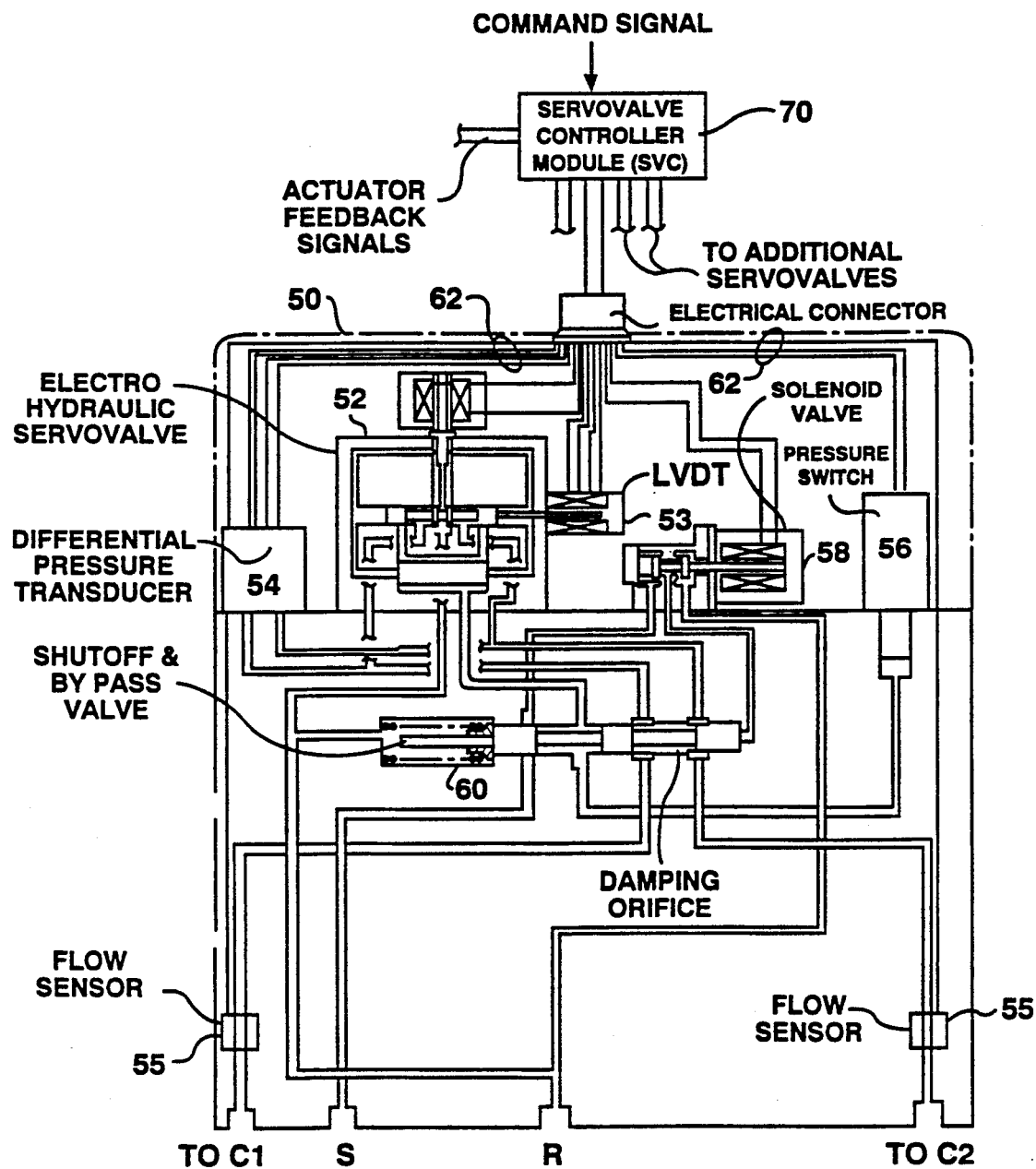
FIG. 3 is a hydraulic schematic diagram illustrating an individual servovalve module of the present invention.

With reference now to FIG. 3, there is illustrated a hydraulic schematic diagram of a single servovalve assembly 50. Each individual servovalve assembly 50 comprises an electrohydraulic servovalve 52 which receives fluid from a reservoir (not shown) via supply port S and supplies it to ports C1 and C2 of an actuator (not shown) and returns fluid to the reservoir via return line R. Servovalve assembly 50 also comprises a plurality of built-in sensors for monitoring valve status and operation, as will now be described.

Linear voltage differential transformer (LVDT) 53, connected to the second stage of the servovalve, monitors the position of the servovalve and generates a valve position signal corresponding thereto. Differential pressure transducer 54 measures the pressure differences in the actuator cylinder chambers and the hydraulic lines and passageways connected thereto. Differential pressure transducer 54 is preferably a strain gage device. However, any suitable pressure sensing device may be used. Flow sensors 55 measure the actual flow rate through the servovalve. Any well known suitable flow sensor may be used as flow sensor 55. Pressure switch 56 is provided to indicate whether hydraulic fluid under pressure is being provided to the system.

Solenoid valve 58 regulates the pressure of the fluid delivered by the servovalve to the actuator via ports C1 or C2. As shown in FIG. 3, solenoid valve 58 is deactivated so that the fluid under pressure from the hydraulic source S is not supplied to the circuit but is instead blocked by the shut-off/by-pass valve 60. When energized, solenoid valve 58 permits fluid under pressure to enter shut-off valve 60 and move it to the left, thereby isolating ports C1 and C2 from each other. Once so isolated, fluid may flow from the servovalve to the specified port as required. The various sensor input signals of each modular o servovalve assembly are carried by respective wires 62 to programmable servovalve controller 70.

Figure 4:
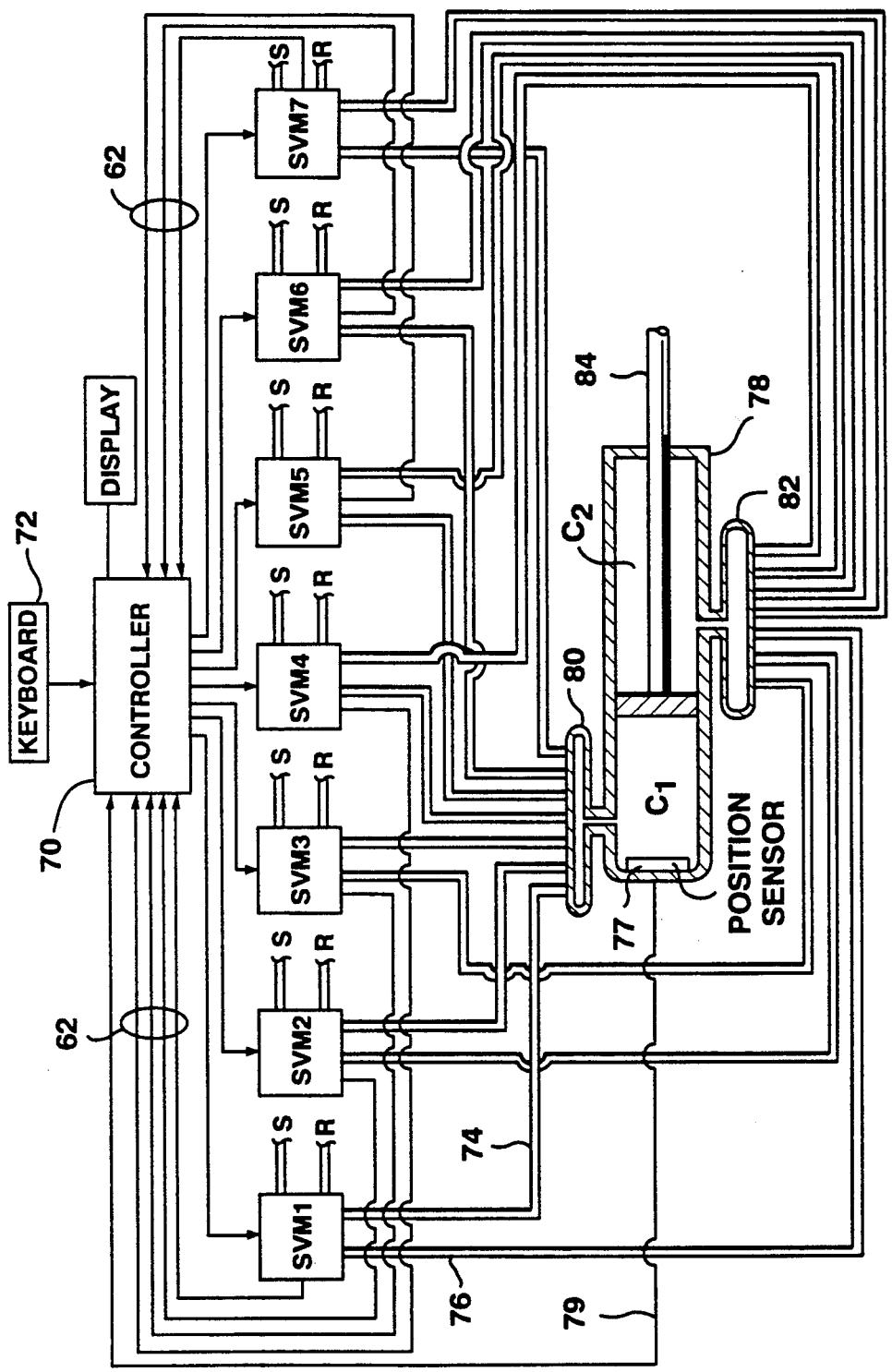
FIG. 4 is a hydraulic schematic diagram showing a centrally controlled system of servovalve modules constructed in accordance with the present invention.

With reference to FIG. 4, a centrally controlled hydraulic system, constructed in accordance with the present invention, for operating an actuator will now be described. The system shown in FIG. 4 includes a conventional programmable controller 70 which may be programmed by means of a keyboard 72. A suitable display terminal (not numbered) is connected to the controller to facilitate programming of the controller and to permit the user to check the status of servovalve modules controlled thereby.

Preferably, controller 70 is programmed to store in its memory a data table consisting of the individual operating characteristics for each servovalve. Such operating characteristics would include values of both fluid pressure and flow rate as functions of valve position. It is also contemplated that other data relating to valve performance may also be included.

In the system illustrated in FIG. 4, a group of seven identical servovalve modules SVM1-SVM7 is operatively connected to controller 70 so as to receive respective valve position control signals therefrom. Each servovalve is connected by fluid lines 74 and 76 to chambers C1 and C2, respectively of actuator 78. It will be apparent that depending upon the fluid pressure characteristics of the individual servovalve modules and the fluid pressure requirements of the particular actuator, a smaller or greater number of servovalve units may be used.

The connection of the fluid lines to chambers C1 and C2 of the actuator may be accomplished using any conventional fitting. Preferably, a pair of manifolds 80 and 82 each having a plurality of fluid terminals formed thereon are utilized for this purpose.

The output signals of the LVDT 53 differential pressure transducer 54 and flow sensors 55 of each servovalve module are operatively connected to programmable controller 70 via respective wires 62. A feedback signal of ram position sensor 77 is received by programmable controller 70 via wire 79. Ram position sensor 77 may take any desired form, such as an array of optical sensors. Preferably, however, an LVDT mounted within a bore in the end of the ram (not shown) and the controller is programmed to calculate ram position by monitoring the signals received therefrom. The output signals of the servovalve and actuator sensors are monitored in accordance with a ram positioning program which will now be described.

Figure 5:
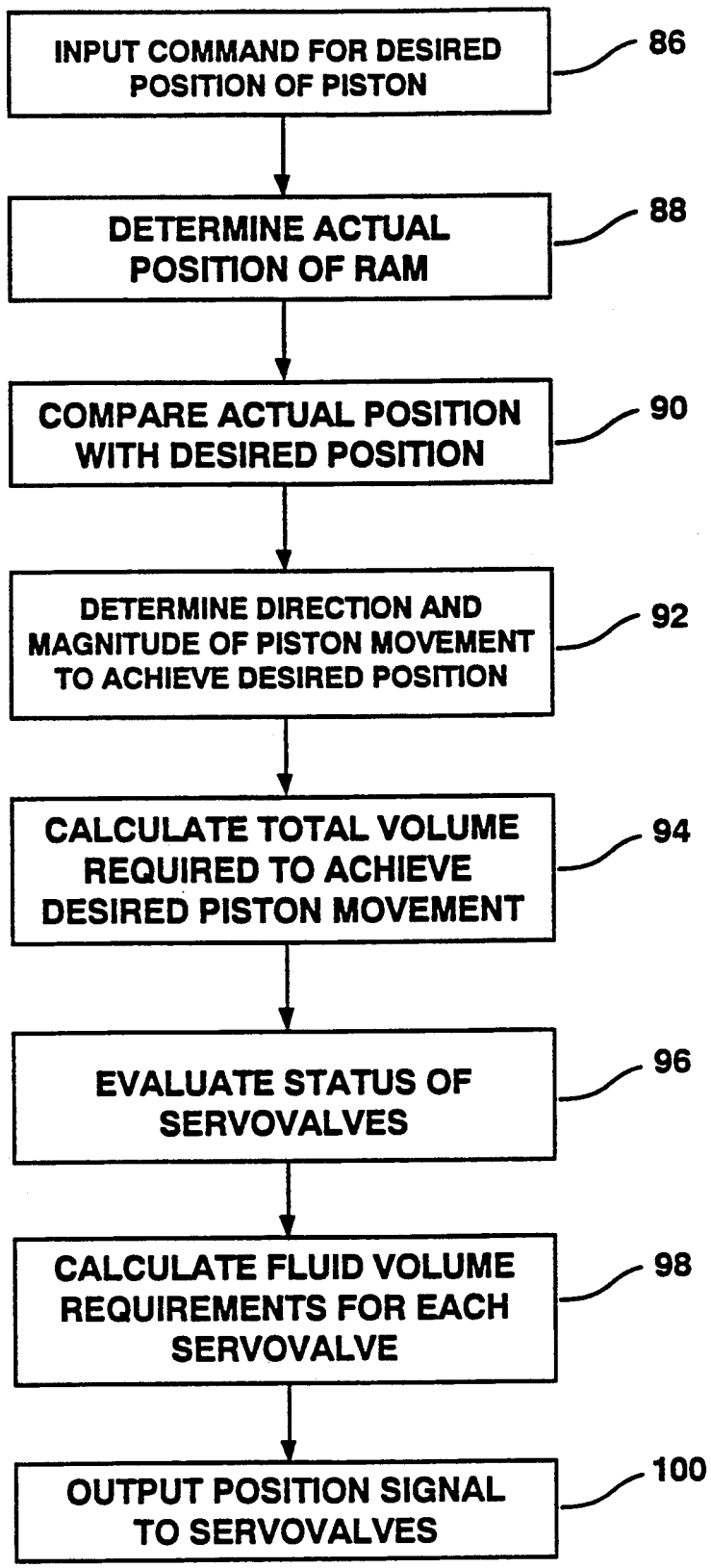
FIG. 5 is a flow chart representation of a servovalve control program executed by the central controller of the present invention to achieve a desired movement of the actuator ram.

With particular reference to FIG. 5, the operation of programmable controller 70 will now be described. As depicted in activity block 86, controller 70 receives a signal that corresponds to an input command for the desired position of actuator ram 84. After receiving the input command, the controller utilizes a ram LVDT signal to ascertain the actual position of the ram, as represented in activity block 88. As shown in activity block 90, controller 70 compares the actual position of the ram with the desired position of the ram. A data table of the controller relates chamber volume to ram position.

After comparing the actual position of the ram with the desired position, the controller determines the direction and degree of any ram displacement required, as shown in activity block 92. Based on a data table contained in the memory of the controller, a calculation is made of the total volume of fluid required in chamber C1 or C2 to achieve the desired ram movement, as depicted in activity block 94. Based on the direction of movement, the controller designates current chamber to receive added fluid and calculates the volume of additional fluid which must be supplied to the port of that chamber in order to effect proper movement of the ram.

As shown in activity block 96, after calculating the volume of fluid to be added to the designated chamber, the controller checks the status of the designated servovalves to verify that they are all working properly. The status checking step will be more fully discussed later.

As represented in activity block 98, once it has been determined that the designated servovalves are working properly, the controller apportions the total flow rate requirements derived in the step of block 94 among the designated servovalve modules.

Controller 70 may be programmed to produce any desired performance level using any predetermined combination of the modular servovalve units. For noise and system response reasons, it might be desirable to operate each of the seven servovalve modules shown in FIG. 4 at a small fraction of their flow capacity to produce a total flow output that any one of them could supply. Upon malfunction of any one of them, the remaining units would still be capable of meeting system flow requirements.

Using the system shown in FIG. 4 in a control surface actuator application requiring a flow rate of 50 gal/min, wherein the seven servovalve modules are capable of delivering 10 gal/min each, they might be operated by controller 70 such that five servovalves are operated at full capacity and the remaining two are reserved as spares. The controller 70 could be programmed to isolate a malfunctioning servovalve, take it off-line, and switch to one of the spare servovalves as required. Because the spare servovalve units can be switched into operation as needed, the centrally controlled, modular system of the present invention provides the same or a greater degree of safety at a greatly reduced cost by avoiding the expense associated with entire system redundancy.

Referring once again to FIG. 5, if the designated servovalves are Operative, respective output control signals are then sent thereto by controller 70 so as to achieve the required flow rate, as shown in activity block 100.

Figure 6:
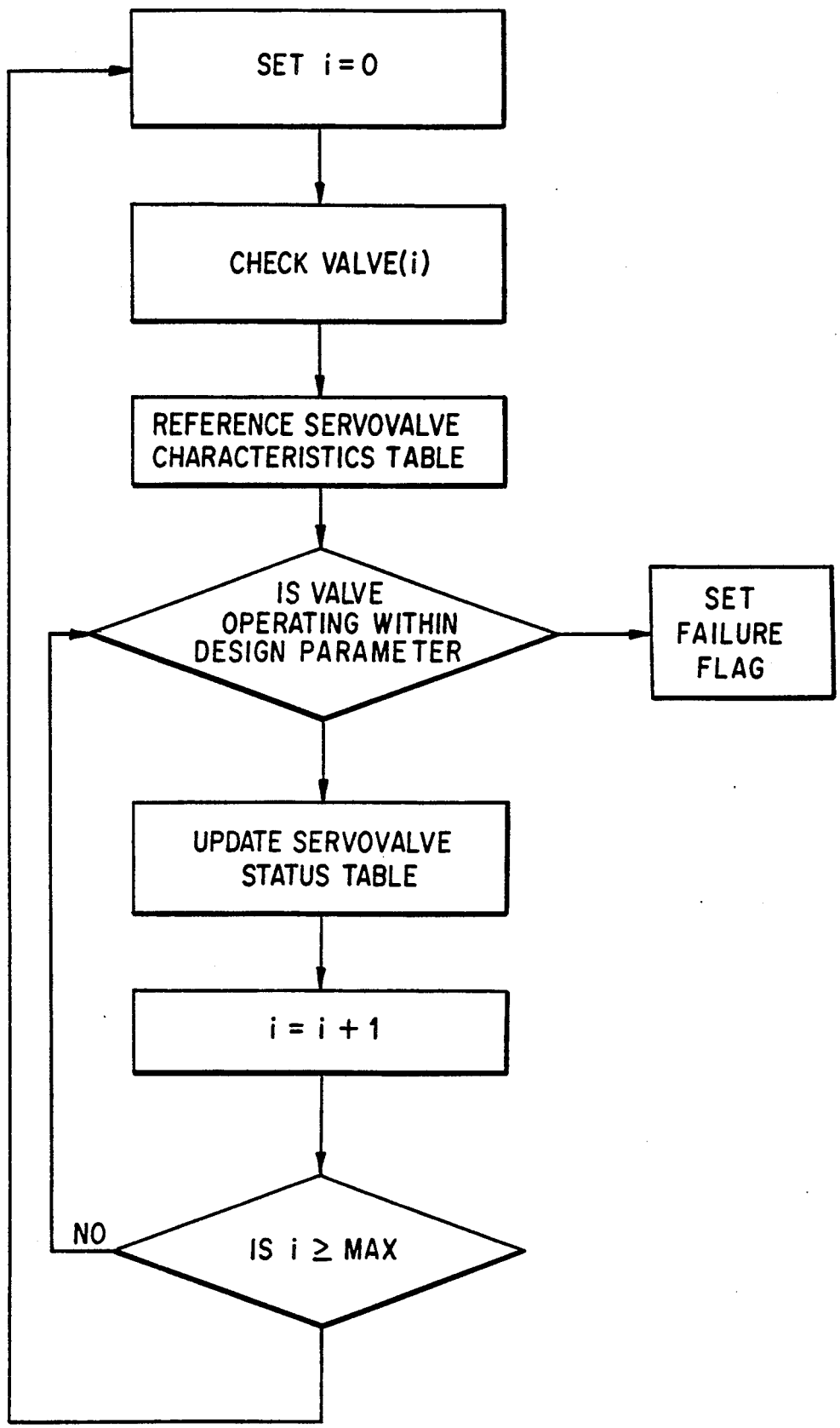
FIG. 6 is a flow chart representation of a program executed by the central controller of the present invention to monitor individual servovalve performance.

Referring to FIG. 6, the step of checking the status of the designated servovalves will now be described in detail. As discussed above, once controller 70 has determined the necessary fluid requirements of the actuator, determinations must be made as to which servovalves will be designated to deliver the fluid to the actuator, and at what flow rate.

Controller 70 is programmed with expected operating values for each servovalve. Among these parameters are expected values of valve pressure and flow rate as a function of valve position. In order to determine whether a servovalve is operating within design parameters, controller 70 monitors the actual valve position, pressure, and flow rate, as measured by the LVDT, pressure transducers, and flow sensors of each module. Then in accordance with the program shown in FIG. 6, the expected and actual values are compared. If SVM1 is operating within system parameters, the status table is updated and the next servovalve module, SVM2, is checked. If any of the servovalve modules fail, a failure flag is set and displayed on the terminal. Then, the controller isolates the failed servovalve module by energizing solenoid valve 58 to allow fluid to operate shutoff valve 60.

As shown in Table 1, servovalves SVM1–SVM4 are all functioning properly. Servovalve SVM5 has failed and has been taken off line by controller 70. Spare SVM6 was designated for operation and opened by controller 70 to ensure continued flow of fluid to and from the actuator.

TABLE 1

| VALVE | MODE | POSITION | FLOW RATE (gal/min) |
|---|---|---|---|
| SVM1 | OPERATIVE | 100% OPEN | 10 |
| SVM2 | OPERATIVE | 100% OPEN | 10 |
| SVM3 | OPERATIVE | 100% OPEN | 10 |
| SVM4 | OPERATIVE | 100% OPEN | 10 |
| SVM5 | FAILED | CLOSED | 0 |
| SVM6 | OPERATIVE | 100% OPEN | 10 |
| SVM7 | STANDBY | CLOSED | 0 |

If low noise operation is desired, the controller could also be programmed to operate all valves at equal flow rates, thereby minimizing the flow rate in any one valve. Failure of any one valve could be compensated for by increasing the flow rate in the remaining operative valves.

Figure 7:
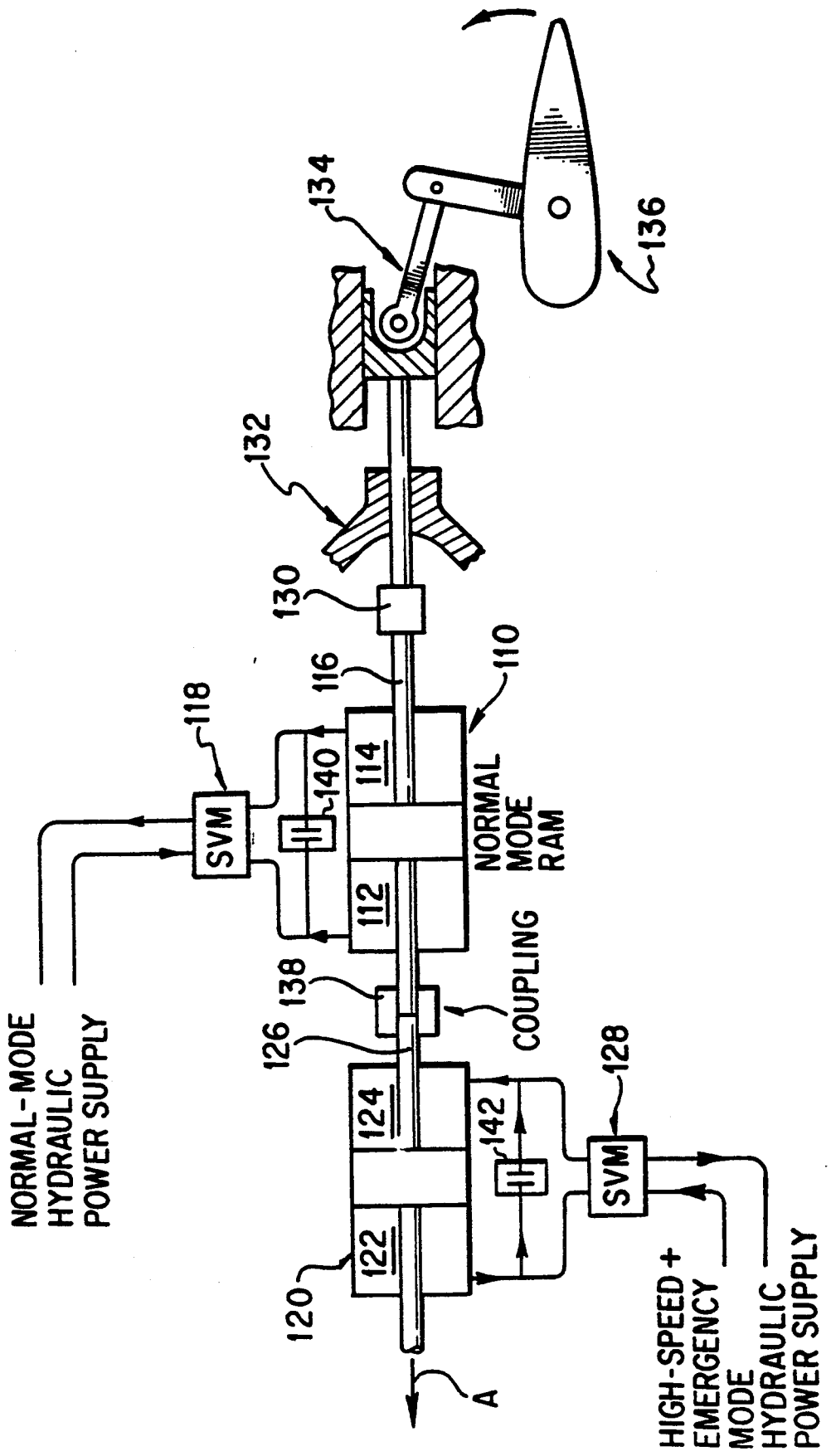
FIG. 7 is a hydraulic schematic diagram showing a possible actuator control system constructed in accordance with the present invention.

As shown in FIG. 7, system integration of the modular servovalve of the present invention can make inclusion of a power transfer valve unnecessary even in high reliability hydraulic systems. Contrary to the single actuator system of FIG. 2, the system shown in FIG. 7 utilizes a pair of conventional ram actuators 110 and 120. Normal mode actuator 110 defines two chambers 112 and 114 and includes a ram 116 extending therethrough and acting as a fluid barrier therebetween. Emergency actuator 120 also defines a pair of chambers 122 and 124 and includes a ram extending therethrough and acting as a barrier therebetween. Each actuator is supplied with pressurized fluid by one or more servovalve modules, 118 and 128, respectively.

By suitable coupling means 130 that extend through pressure hull 132, one end of ram 116 is coupled to steering linkage 134 of control surface component 136. An end of ram 126 is coupled to the other end of ram 116 by suitable coupling means 138. The flow rates of actuators 110 and 120 are preferably identical such that each is capable of independently operating the steering linkage upon failure of the other. The programmable controller monitors operation of the servovalve modules, and upon a determination that there is a malfunction in the normal source servovalves which precludes low noise operation or critically reduces the low rate of fluid to the normal actuator, the servovalves feeding the normal actuator are closed and the servovalves feeding the emergency actuator are opened. To prevent hydraulic locking of steering linkage 134 by emergency actuator 124 during normal actuator operation, or by normal actuator 110 upon emergency transfer, blocking valves 140 and 142 are provided between the fluid supply lines of the actuator.

Blocking valves 140 and 142 are constructed to permit fluid to freely circulate between the respective chambers of the actuators when closed. Thus, the fluid can be rapidly evacuated between the chambers of the inoperative actuator during movement of the operative actuator ram. Referring to FIG. 7, when rams 116 and 126 are moved in the direction of the arrow A by delivery of fluid into chamber 114, fluid in actuator 120 passes from chamber 122 to chamber 124 via closed blocking valve 142. Blocking valve 140 is open so that fluid leaving chamber 112 returns via a return line to the servovalve module(s).

The inclusion of redundant actuators 110 and 112 is also useful for selecting between high and low speed operating modes. The controller may be programmed to operate both actuators simultaneously upon the input of a high speed operation signal. Blocking valves 140 and 142 would both be set in the open position, and the flow rates to each actuator would be equalized by the controller in accordance with a suitable servovalve operating program. When high speed operation is no longer required, the controller would close one of the blocking valves and cease delivering fluid to the unneeded actuator.

The present invention thereby provides a novel, centrally controlled, modular hydraulic fluid supply system particularly useful in conjunction with critical function actuators aboard a submarine, although other applications may be made as might occur to one of ordinary skill in the applicable field. The embodiments described and illustrated are for purposes of example only, and other embodiments may be developed without departing from the spirit of the invention or from the scope of the appended claims.

What is claimed is:

1. A modular hydraulic control system for controlling a fluid actuator, wherein said actuator is of the type having a cylinder, a ram member slidably disposed within said cylinder and defining first chamber and second chambers therein, an actuator rod member connected to said ram member, first port means for admitting pressurized fluid into and out of said first chamber, and second port means for transferring pressurized fluid into and out of said second chamber, said system comprising:

valve means, in fluid communication with said first and second port means and responsive to a mode control signal, for transferring fluid at a total flow rate corresponding to a total flow rate command signal into said first chamber when in a first mode and into said second chamber when in a second mode;

said valve means including at least one subvalve, each of said at least one subvalve comprising means responsive to said mode control signal, for transferring fluid at a subvalve flow rate corresponding to a subvalve rate control signal, into said first chamber when in said first mode and into said second chamber when in said second mode;

said valve means further including a programmable controller for receiving a desired ram position signal and for generating said mode control signal, said total flow rate command signal, and said subvalve rate control signal in response thereto, said programmable controller including a memory containing data corresponding to expected subvalve flow rate as a function of subvalve position;

said programmable controller further including means for receiving a signal corresponding to an actual flow rate through each of said at least one subvalve, and based on said received flow rate signals, for generating said subvalve rate control signals such that said subvalve flow rates corresponding to said subvalve rate control signals through each of said at least one subvalve are substantially equal and such that a sum of said subvalve flow rates substantially equals said total flow rate; and means operatively connected to said valve means for detecting a malfunctioning subvalve of said at least one subvalve and means for isolating said malfunctioning subvalve from said first and second port means, said means for detecting a malfunctioning subvalve comprising means for measuring an actual position of each of said at least one subvalve and sending a signal corresponding thereto to said programmable controller, and means for measuring actual flow rate through each of said at least one subvalve and sending a signal corresponding thereto to said programmable controller, and wherein said programmable controller receives said measured position and flow rate signals and compares them with said expected data and wherein upon said malfunctioning subvalve being isolated from said first and second port means said programmable controller generates a subvalve rate control signal for each operative subvalve such that the total of said operative subvalve rate control signals corresponding to said total flow rate command signal.

2. The system of claim 1, wherein each subvalve comprises an electrohydraulic servovalve.

3. The system of claim 2, wherein said system further comprises a plurality of spare servovalves and wherein said programmable controller includes means for energizing at least one spare servovalve to replace a malfunctioning servovalve such that the sum of said actual detected flow rates remains substantially equal to said total flow rate.

4. A modular hydraulic control system for controlling first and second actuators, wherein each actuator is of the type having a cylinder, a ram member slidably disposed within said cylinder and defining first chamber and second chambers therein, an actuator rod member connected to said ram member, first port means for admitting pressurized fluid into and out of said first chamber, and second port means for transferring pressurized fluid into and out of said second chamber, said system comprising:

means for coupling the rod members of said first and second actuators in substantially longitudinal relation;

a first subvalve in fluid communication with the first and second port means of said first actuator and a second subvalve in fluid communication with the first and second port means of said second actuator;

means for rapidly transferring fluid between the first and second chambers of a respective one of said actuators, said means for rapidly transferring fluid comprising a first blocking valve in fluid communication with the first and second chambers of the first actuator and a second blocking valve in fluid communication with the first and second chambers of the second actuator;

control means for receiving a desired ram position signal and for generating subvalve rate control signals in response thereto, wherein said first and second subvalves are operated in accordance with said control signals, and further wherein said control means comprises a programmable controller, said programmable controller including a memory containing data corresponding to expected flow rate and values as a function of subvalve position;

said programmable controller further includes means for receiving a signal corresponding to an actual flow rate through each of said subvalves, and based on said received flow rate signals, for generating said subvalve rate control signals such that said subvalve flow rates corresponding to said subvalve rate control signals through each of said subvalves are substantially equal and wherein the sum of the subvalve flow rates through each of said subvalves substantially equals a total flow rate;

means for detecting a malfunction of said subvalves and means for isolating a malfunctioning subvalve from said first and second port means;

said malfunction detecting means comprises means for measuring an actual position of each subvalve and sending a signal corresponding thereto to said programmable controller, and means for measuring actual flow rate through each subvalve and sending a signal corresponding thereto to said programmable controller, wherein said programmable controller receives said position and flow rate signals from said detecting means and compares values represented thereby with said expected data; and a plurality of spare subvalves and wherein said programmable controller includes means for energizing at least one spare subvalve to replace a malfunctioning subvalve such that the sum of said actual detected flow rates remains substantially equals to said total flow rate.

5. The system of claim 4, wherein said means for rapidly transferring fluid are operable in response to signals sent by said programmable controller, said programmable controller being programmed to initiate rapid transfer of fluid between the first and second chambers of said first actuator upon malfunction of said first servovalve.

6. A method of operating a hydraulic ram actuator, wherein said actuator is of the type having a cylinder, a ram member slidably disposed within said cylinder and defining first chamber and second chambers therein, so as to move said ram to a desired ram position, comprising the steps of:

(a) ascertaining an actual position of said ram by monitoring an output signal of a ram position sensing means, and comparing said actual ram position with said desired ram position using a programmable controller, said programmable controller having a memory containing values of ram position as a function of volume of said chambers of the actuator;

(b) calculating with said programmable controller the direction and magnitude of ram movement required to achieve said desired ram position and the total volume change required in one of said chambers of the actuator to achieve said ram movement; and (c) generating with said programmable controller a flow control signal to at least one electrohydraulic servovalve, said flow control signal based on said calculated total volume change required in one of said chambers of the actuator and directing said at least one electrohydraulic servovalve to transfer hydraulic fluid to said chamber to achieve said desired ram position, wherein said generating step further includes the steps of:

(1) monitoring with said programmable controller the signals of respective flow rate and position sensors connected to corresponding electrohydraulic servovalves;

(2) determining which of said at least one electrohydraulic servovalves to operate in accordance with said monitored signals, wherein said determining step comprises the steps of comparing measured values of flow rate and position for corresponding electrohydraulic servovalves with expected values of flow rate and position stored in a memory of said programmable controller and identifying any malfunctioning servovalves;

(3) calculating the flow rate of fluid to be delivered by each operative servovalves to obtain said desired ram position; and (4) generating a signal for each operative servovalve corresponding to said calculated flow rates.

7. The method of claim 6, wherein said determining step further comprises the steps of isolating said any malfunctioning servovalve from said first and second chambers of the actuator such that no flow passes through said any malfunctioning servovalves and increasing the flow rates of other operative servovalves until said ram achieves said desired position.

8. The method of claim 6, wherein said determining step further comprises the steps of isolating said any malfunctioning servovalve from said first and second chambers of the actuator such that no flow passes through said any malfunctioning servovalves and initiating flow through a spare servovalve until said ram achieves said desired position.

* * * * *